United States Patent
Elder et al.

(10) Patent No.: US 10,381,658 B2
(45) Date of Patent: Aug. 13, 2019

(54) FUEL CELL STACK

(71) Applicant: PLUG POWER INC., Latham, NY (US)

(72) Inventors: Charles Russell Elder, Averill Park, NY (US); James D'Aleo, Clifton Park, NY (US)

(73) Assignee: PLUG POWER INC., Latham, NY (US)

( * ) Notice: Subject to any disclaimer, the term of this patent is extended or adjusted under 35 U.S.C. 154(b) by 195 days.

(21) Appl. No.: 15/388,547

(22) Filed: Dec. 22, 2016

(65) Prior Publication Data

US 2018/0183076 A1  Jun. 28, 2018

(51) Int. Cl.
| | |
|---|---|
| *H01M 8/025* | (2016.01) |
| *H01M 8/0258* | (2016.01) |
| *H01M 8/2465* | (2016.01) |
| *H01M 8/0247* | (2016.01) |
| *H01M 8/1004* | (2016.01) |
| *H01M 8/0273* | (2016.01) |
| *H01M 4/86* | (2006.01) |

(52) U.S. Cl.
CPC ....... *H01M 8/0258* (2013.01); *H01M 8/0247* (2013.01); *H01M 8/0273* (2013.01); *H01M 8/1004* (2013.01); *H01M 8/2465* (2013.01); *H01M 4/8605* (2013.01); *H01M 2250/20* (2013.01); *Y02P 70/56* (2015.11)

(58) Field of Classification Search
CPC ............. H01M 8/0258; H01M 8/2465; H01M 8/0271; H01M 8/0247; H01M 8/1004; H01M 8/0273; H01M 4/8605
USPC .......................................... 429/469
See application file for complete search history.

(56) References Cited

U.S. PATENT DOCUMENTS

| | | | |
|---|---|---|---|
| 6,280,870 B1 * | 8/2001 | Eisman ............... | H01M 4/8626 429/456 |
| 8,153,333 B2 * | 4/2012 | Sugita ................. | H01M 8/0247 429/534 |
| 2008/0143061 A1 * | 6/2008 | Steinbach ........... | H01M 8/0202 277/654 |
| 2010/0124690 A1 * | 5/2010 | Chen .................... | H01M 8/0247 429/465 |

* cited by examiner

*Primary Examiner* — Amanda C. Walke
(74) *Attorney, Agent, or Firm* — Heslin Rothenberg Farley & Mesiti P.C.; Victor A. Cardona, Esq.

(57) ABSTRACT

A fuel cell stack includes a fluid flow plate at an outer end, a sealing member contacting the fluid flow plate and a gas diffusion layer, and a catalyst layer inside the gas diffusion layer. A membrane is located at a central location between the catalyst layer and a second catalyst layer. The fluid flow plate includes a channel for receiving a portion of a perimeter of the gas diffusion layer.

13 Claims, 3 Drawing Sheets

FUEL CELL STACK

TECHNICAL FIELD

This invention relates in general to electrochemical cells, and more particularly to fuel cells systems and methods.

BACKGROUND OF THE INVENTION

Fuel cells electrochemically convert fuels and oxidants to electricity and heat and can be categorized according to the type of electrolyte (e.g., solid oxide, molten carbonate, alkaline, phosphoric acid or solid polymer) used to accommodate ion transfer during operation. Moreover, fuel cell assemblies can be employed in many (e.g., automotive to aerospace to industrial to residential) environments, for multiple applications.

A Proton Exchange Membrane (hereinafter "PEM") fuel cell converts the chemical energy of fuels such as hydrogen and oxidants such as air directly into electrical energy. The PEM is a sold polymer electrolyte that permits the passage of protons (i.e., H+ ions) from the "anode" side of the fuel cell to the "cathode" side of the fuel cell while preventing passage therethrough of reactant fluids (e.g., hydrogen and air gases). The Membrane Electrode Assembly (hereinafter "MEA") is placed between two electrically conductive plates, each of which has a flow passage to direct the fuel to the anode side and oxidant to the cathode side of the PEM.

Two or more fuel cells can be connected together to increase the overall power output of the assembly. Generally, the cells are connected in series, wherein one side of a plate serves as an anode plate for one cell and the other side of the plate is the cathode plate for the adjacent cell. Such a series of connected multiple fuel cells is referred to as a fuel cell stack. The stack typically includes means for directing the fuel and the oxidant to the anode and cathode flow field channels, respectively. The stack usually includes a mechanism for directing a coolant fluid to interior channels within the stack to absorb heat generated by the exothermic reaction of hydrogen and oxygen within the fuel cells. The stack generally includes mechanisms for exhausting the excess fuel and oxidant gases, as well as product water.

The stack also includes an endplate, insulators, membrane electrode assemblies (MEA), gaskets, separator plates, electrical connectors and collector plates, among other components, that are integrated together to form the working stack designed to produce electricity. The different plates may be abutted against each other and connected to each other to facilitate the performance of particular functions.

The MEA is formed of a membrane, catalyst layers and gas diffusion layers. The manufacture of an MEA can result in a relatively hard perimeter being formed on a gas diffusion layer (GDL) of the MEA that does not easily compress when it contacts a flat area of a plate housing fluid flow channels adjacent to the flow field channels. It is desirable for a fuel cell stack to have enough compression of the GDLs to ensure good contact and low electrical resistance between GDL and plate, and also between GDL and membrane. Because of this hard perimeter in some MEA constructions, the force required to compress the stack to a desirable amount of GDL compression can become excessive. With excessive force required, additional structure must be added to endplates, compression members (springs), and tensioning members of the stack.

Thus, there is a need for improved fuel cell systems and improved methods of manufacturing fuel cells that minimize the force required to efficiently assemble a fuel cell stack.

SUMMARY OF THE INVENTION

The present invention provides, a fuel cell stack including a fluid flow plate at an outer end, a sealing member contacting the fluid flow plate and a gas diffusion layer, and a catalyst layer inside the gas diffusion layer. A membrane is located at a central location between the catalyst layer and a second catalyst layer. The fluid flow plate includes a channel for receiving a portion of a perimeter of the gas diffusion layer.

BRIEF DESCRIPTION OF THE DRAWINGS

The subject matter which is regarded as the invention is particularly pointed out and distinctly claimed in the claims at the conclusion of the specification. The foregoing and other features and advantages of the invention will be readily understood from the following detailed description of the preferred embodiments taken in conjunction with the accompanying drawings in which:

DETAILED DESCRIPTION

In accordance with the principles of the present invention, fuel cell systems and methods are provided.

Figure 1:
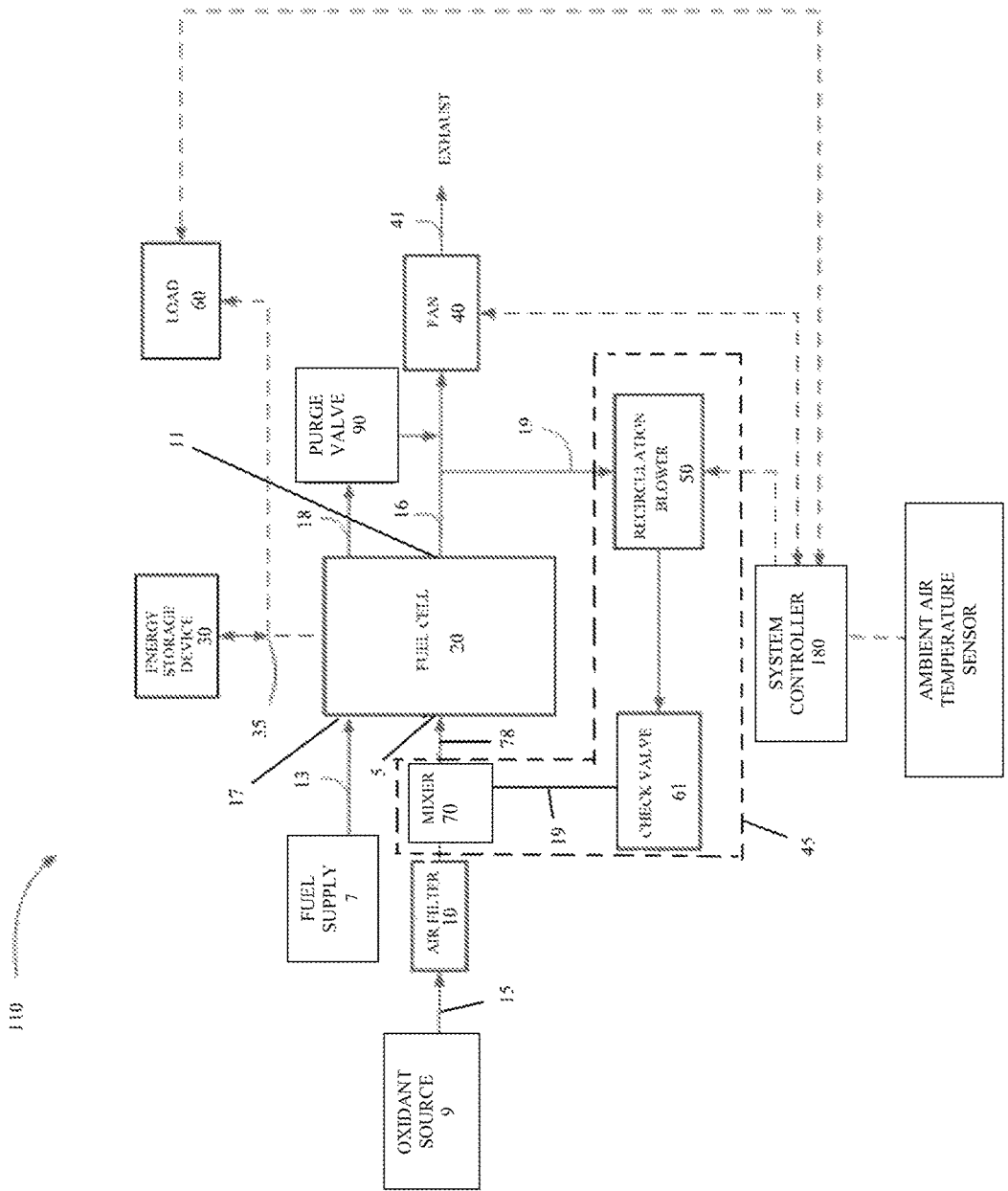
FIG. 1 is a block diagram of a fuel cell system in accordance with the invention.

In an example depicted in FIG. 1, a fuel cell system 10 is referred to as the assembled, or complete, system which functionally together with all parts thereof produces electricity and typically includes a fuel cell stack 20 and an energy storage device (30). The fuel cell is supplied with a fuel 13, for example, hydrogen, through a fuel inlet 17. Excess fuel 18 is exhausted from the fuel cell through a purge valve 90 and may be diluted by a fan 40. In one example, fuel cell stack 20 may have an open cathode architecture of a PEM fuel cell, and combined oxidant and coolant, for example, air, may enter through an inlet air filter 10 coupled to an inlet 5 of fuel cell 20. Excess coolant/oxidant and heat may be exhausted from a fuel cell cathode of fuel cell stack 20 through an outlet 11 to fan 40 which may exhaust the coolant/oxidant and/or excess fuel to a waste exhaust 41, such as the ambient atmosphere. The fuel and coolant/oxidant may be supplied by a fuel supply 7 and an oxidant source 9 (e.g., air), respectively, and other components of a balance of plant, which may include compressors, pumps, valves, fans, electrical connections and sensors.

Figure 2:
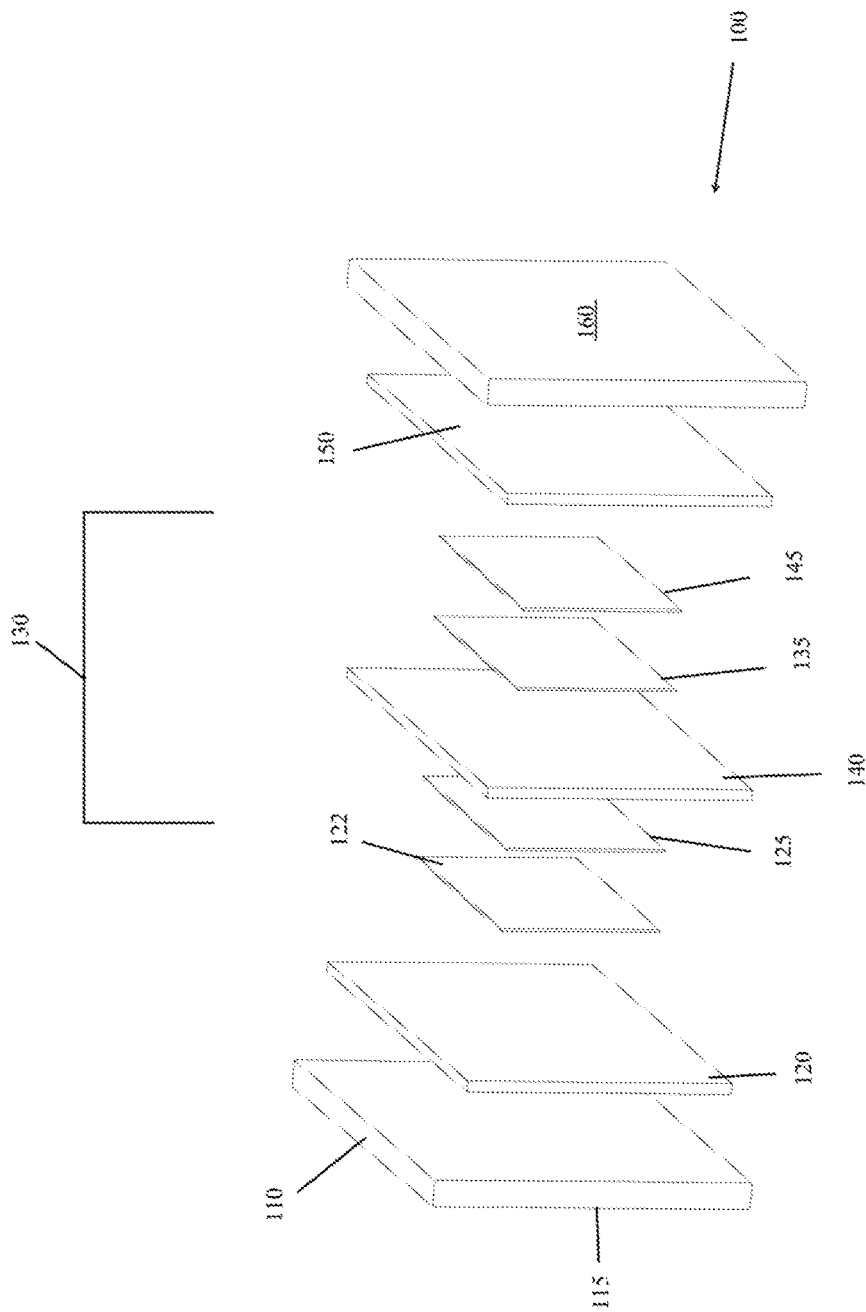
FIG. 2 depicts a perspective exploded view of an internal sub-assembly of the system of FIG. 1.

FIG. 2 depicts an internal subassembly 100 of fuel cell stack 20 of FIG. 1 including a cathodic end fluid flow plate 110 at an outer end 115 and a flow plate seal 120 on an inner side thereof. A membrane electrode assembly (MEA) 130 is located between seal 120 and a second flow plate seal 150. An anode flow plate 160 is on a second end 165 of subassembly 100.

MEA 130 includes a membrane 140 between a cathode side catalyst layer 125 and an anode side catalyst layer 135. A cathode side gas diffusion layer (GDL) 122 is located between cathode side catalyst layer 125 and flow plate 110. An anode side gas diffusion layer 145 is located between anode side catalyst layer 135 and flow plate 160. Seal 120 and seal 150 may be received in a channel of on an inner side of flow plate 110 and flow plate 160, respectively.

Figure 3:
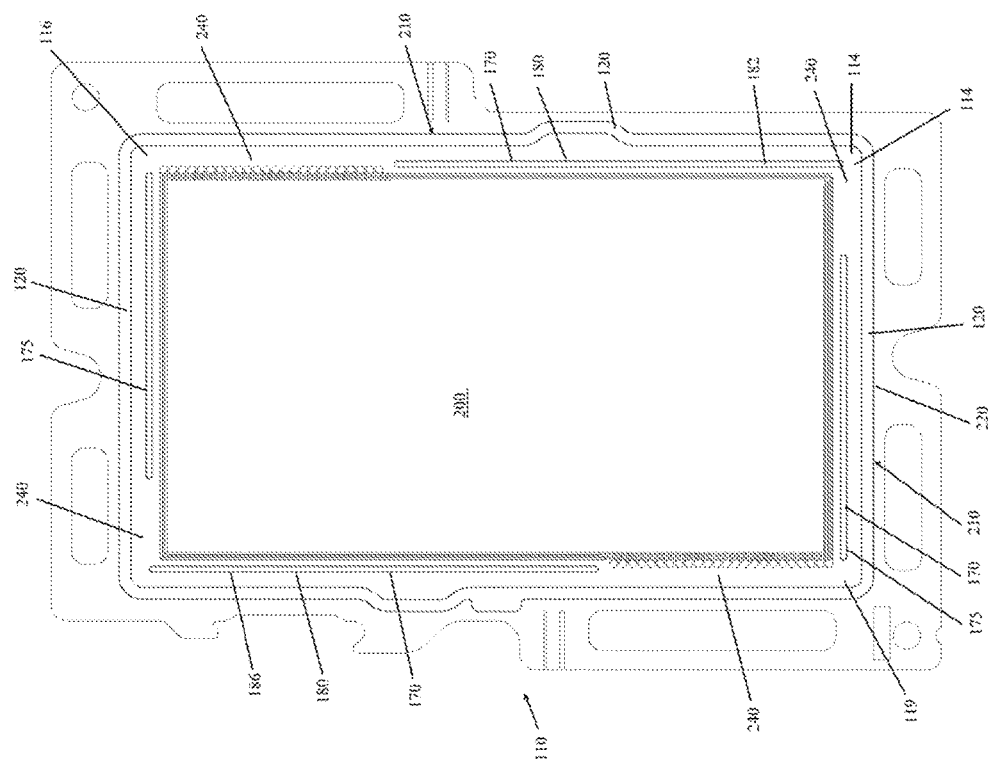
FIG. 3 depicts a top plan view of a cathode flow plate of the sub-assembly of FIG. 2.

FIG. 3 depicts cathode flow plate 110 which includes a flow channel area 200 including a plurality of flow channels (not shown for ease of illustration) at a central portion thereof to receive a flow of an oxidant (e.g., oxygen or air) during operation of fuel cell stack 20 to generate electricity. As indicated, flow plate 110 may have a seal channel 210 along an entire perimeter thereof to receive seal 120 to inhibit movement of the oxidant from flow channels 200 and inhibit movement of contaminants into flow channels 200. Seal 120 may extend out of seal channel 210 above a surface 220 of flow plate 110 adjacent seal channel 210. To achieve proper compression when assembled, a seal (e.g., seal 120) may prevent migration of fluids or contaminants. For example, seal 120 may be a nominal 1.27 mm high seal positioned in a 0.523 deep seal groove (i.e., seal channel 170), and may extend above the plate (i.e., surface 220) 0.747 mm. When compressed, the seal (e.g., seal 120) may be only 0.889 high. The difference between the seal depth and the compressed seal height is due to the thickness of the MEA assembly (i.e., MEA assembly 136). The gasket must reach across a gap produced by a thickness of the MEA and affect a seal on the adjacent plate.

Cathode flow plate 110 may include a plurality of dive through hole areas 240 which are located at a location corresponding to where dive through holes 241 are located. Such dive through holes connect the flow channels to manifold ports of a fuel cell stack. Cathode flow plate 110 may also include a plurality of relief channels 170 for receiving a portion of cathode side gas diffusion layer 122. Relief channels 170 may include width channels 175 and longitudinal channels 180 aligned in a widthwise direction and longitudinal direction, respectively, as is evident from FIG. 3. Each of channels 170 may include one or more such channels parallel to each other. Such channels (i.e., channels 170) could be formed of any shape to receive portion of GDL 122. For example, relief channels 176 may be rectangular in shape, and may have dimensions of 0.30 mm deep and 2 mm wide. As depicted, channels may extend along a side of plate 110 but not an entire side thereof. For example, longitudinal channels 180 may extend longitudinally, but a channel 182 may extend upwardly from a bottom end 114 and not extend to a top end 116 while similarly, a longitudinal channel 186 of longitudinal channels 180 may extend downwardly but not extend to bottom 119 of plate 110. For example, longitudinal channels could extend along the sides of plate 110 except in dive through hole areas 240. Further, width channels 175 may extend horizontally for a portion of a width of flow plate 110 and not extend a full width of flow channels 200. For example, width channels 175 may avoid extending into dive flow through areas 240.

As indicated above, due to some methods of constructing an MEA, a relatively hard perimeter may exist on the GDL (e.g., cathode side gas diffusion layer 122) that does not easily compress when it lands/contacts on a flat area (e.g., a flat portion 185 outside flow channels 200) of a flow plate (e.g., flow plate 110) adjacent to flow channels (e.g., flow channels 200) of the plate. An assembled fuel cell stack (e.g., fuel cell stack 20) must have enough compression of GDLs (e.g., GDL 122) therein to ensure good contact and low electrical resistance between each GDL and the plate (e.g., plate 110) contacting it, and also between the GDL and a membrane (e.g., membrane 140). The indicated hard perimeter in some MEA constructions makes it necessary to use a force to compress the fuel cell stack (e.g., stack 20) to a desirable amount of GDL compression which could be excessive. Such excessive force could require that additional structure be added to endplates, compression members (e.g., springs), and tensioning members of the stack. For example, an excess of force of 10,000 lbf may be required to compress a fuel cell stack formed under prior art methods without the relief channels described herein.

Relief channels 170 could be added entirely around a flow plate (e.g., plate 110), where the GDL contacting the plate is excessively hard. Such a channel may prevent a need for excessive compression of a fuel cell stack as described above, but such a relief channel entirely around a flow plate could reduce efficiency of the stack because tolerances might allow reactant gases to bypass the active area and therefore be wasted. As depicted in FIG. 3, channels 170 may be located along portions of the sides of a flow plate (e.g., flow plate 110), such that gaps exist between adjacent channels. The use of partial channels (i.e., relief channels not extending along a full side of a plate and not connected to each other) not connected to the main active area channels, and dead ended (i.e., not connected to another relief or fluid flow channel) at a start and end of such a partial channel, would allow a hard portion of a GDL to be received in the relief channels (e.g., channels 170) without losing reactants as described above for a channel extending around an entire perimeter of a flow plate. Such partial channels substantially allow receipt of a hard GDL perimeter, and eliminate any excess compression requirement, thus saving any added structural elements that otherwise would be needed to handle such increased compression, such as added end hardware, spring, and tension rod material.

Partial relief channels, such as relief channels 170, may be added to a cathode follow plate (e.g., flow plate 110) an anode flow plate (e.g., anode flow plate 160) or both such plates. In the event that partial flow channels are added to all sides of a flow plate, such as depicted in FIG. 3 for flow plate 110, it may not be necessary to include relief channels in an opposite flow plate (e.g., flow plate 160). In another example opposite flow plates could include relief channels offset from each other, such as horizontal partial channels on one plate and vertical partial channels on an opposite plate with the channels offset so that any dive through hole areas did not have relief channels directly adjacent. In a further example, opposite flow plates could include flow channels directly opposite one another but each having a smaller depth than if relief channels were present on only one of the plates. For example, such partial channels could be in cathode flow plate 110, anode flow plate 160 or both at the same time in a subassembly, such as subassembly 100. In one example, a fuel cell stack could require a compression of 10,000 lbf using fluid flow plates having GDL's with a hard perimeter without partial relief channels (e.g., relief channels 170) as indicated above. When using fluid flow plates with relief channels (e.g., fuel cell stack 20 with fluid flow plate 110), and all other things being the same, the compression requirement drops to about 6,000 lbf.

Further, as described above, channels 170 avoid extending into dive through hole areas (i.e., areas of a flow plate where dive through holes are located on an opposing plate). The contact of these dive through hole areas with adjacent plates serve a similar purpose of compression relief as relief channels 170 such that relief channels only extend partially on each side of a flow plate and such relief channels stop before connecting to such dive though holes so as to not waste reactants.

Flowfield plates (e.g., plate 110, plate 160) may be electrically and thermally conductive. Such plates carry the electrons from the MEA to either a plate in the next cell in the stack, or to a current collector or a pocket plate as disclosed for example in co-owned U.S. patent application Ser. No. 15/388,517, filed on the same date as this application. Flowfield plates may be very thin (e.g., to provide bulk power density and a shorter path for the electrons, less resistance, etc.). For example, plates 110 and 160 may be 2 mm thick each. Standard materials for flowfield plates are graphite, compressed graphite or Graphoil, a thermoset compound with graphite in a polymer matrix, gold, silver, stainless steel. A membrane of the MEA may be easily contaminated, so such flow plates should also be quite inert to avoid contaminating a membrane of a MEA.

Returning to FIG. 1, an electrical demand by a load 60, for example, an industrial electric vehicle (e.g., an electrically powered forklift truck) on any electric device (e.g., TV, lights, electric heater, electric fan motor), may be connected to the energy storage device 30 and fuel cell stack 20 in parallel by an electrical connection 35. Depending on the demand, power may flow from energy storage device 30, fuel cell 20 or both to the load. In times of high demand in excess of the maximum power output of the fuel cell 20, power may flow from both the fuel cell 20 and energy storage device 30 to load 60. In times of low demand, power may flow to load 60 from fuel cell 20, while excess power from the fuel cell 20 may flow into energy storage device 30 to recharge energy storage device 30 when required. In the case of loads that can source power, such as regenerative braking, power may flow from load 60 to energy storage device 30.

The controller (i.e., controller 180) described above, could be any type of computing unit (e.g., a personal computer operating a WINDOWS operating system or Apple OSX operating system, a Unix system, a microprocessor (which may or may not utilize a BIOS or operating system) or a mobile computing device such as a tablet computer or smart phone) configured to communicate with and/or control a fuel cell (fuel cell 20), temperature sensors located on portions of the fuel cell including the plates thereof, an energy storage device (e.g., energy storage device 30), a balance of a plant, a fuel supply (e.g., a source of oxidants or fuel), a fan (e.g., fan 40), a blower (e.g., blower 50) and/or a load (e.g., load 60). Further, the controller (e.g., controller 180) could be a unit separate from the sensors, fan, blower, fuel cell stack, energy storage device, and load device. Moreover, such a controller could be part of one or more of these components (e.g., the sensors, fan, blower, fuel cell, load device, and energy storage device) or could be distributed between these devices and other connected systems, such as the balance of plant while the distributed portions of such controller could be coupled to each other to allow communication therebetween.

The load (e.g., load 60) described above could be any type of stationary or moveable load device, such as an industrial electrical vehicle or forklift truck. The fuel cell (e.g., fuel cell stack 20) could be any type of fuel cell such as a proton exchange membrane fuel cell, solid oxide fuel cell, or any other fuel cell as would be known by one of ordinary skill in the art. The energy storage device (e.g., energy storage device 30) described above could be any type of battery or other way of storing energy such as a lithium ion battery, lead acid battery, air compression energy storage device, water storage device, capacitor, ultra-capacitor, or any other device for storing energy.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

For the purposes of promoting an understanding of the principles of the invention, reference will now be made to embodiments of the invention and specific language will be used to describe the same. It will nevertheless be understood that no limitation of the scope of the invention is thereby intended, and any alterations and further modifications in the described embodiments, and any further applications of the principles of the invention as illustrated therein as would normally occur to one skilled in the art to which the invention relates are contemplated an protected.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A fuel cell stack comprising:
   a fluid flow plate at an outer end, said fluid flow plate having a flow channel area and a peripheral area around said flow channel area;
   a sealing member contacting the fluid flow plate and a gas diffusion layer;
   a catalyst layer inside said gas diffusion layer;
   a membrane at a central location between said catalyst layer and a second catalyst layer;
   said fluid flow plate comprising a channel in said peripheral area for receiving a portion of a perimeter of said gas diffusion layer, said channel extending along a side of said peripheral area less than an entire longitudinal dimension of said side of said peripheral area.

2. The fuel cell stack of claim 1 wherein said flow plate comprises a cathode flow plate, said sealing member comprises an anode sealing member, and said catalyst layer comprises an anode catalyst layer.

3. The fuel cell stack of claim 1 wherein said flow plate comprises an anode flow plate, said sealing member comprises an anode sealing member, and said catalyst layer comprises an anode catalyst layer.

4. The fuel cell stack of claim 2 wherein said second catalyst layer comprises an anode catalyst layer and further comprising:
   an anode gas diffusion layer outside said anode catalyst layer;
   an anode sealing member outside said anode gas diffusion layer; and an anode fluid flow plate outside and contacting said anode sealing member.

5. The fuel cell stack of claim 1 wherein said anode fluid flow plate comprises a second channel for receiving a portion of a perimeter of said anode gas diffusion layer.

6. The fuel cell stack of claim 1 wherein said channel comprises a relief channel located on a same side of said flow plate as flow channels of said plate and said relief channel is separate from said flow channels.

7. The fuel cell stack of claim 1 wherein said channel is located on a side of said flow plate and extends longitudinally relative to said flow plate less than a full longitudinal distance of said side of said flow plate.

8. The fuel cell stack of claim 1 wherein said channel is located toward an interior of said fluid flow plate relative to said sealing member.

9. The fuel cell stack of claim 1 wherein said flow plate comprises a dive through holes area, said channel and said dive through holes area located on a same side of said flow plate relative to each other, longitudinally mis-aligned relative to each other, separated from each other and avoiding fluid communication with each other.

10. The fuel cell stack of claim 1 wherein said channel comprises a plurality of relief channels on four sides of said flow plate around flow channels of said flow plate, said plurality of relief channels and said flow channels separate from each other and avoiding fluid communication with each other.

11. The fuel cell stack of claim 10 wherein said flow plate comprises a plurality of dive through holes areas, said plurality of relief channels separate from and avoiding fluid communication with said plurality of dive through holes areas.

12. The fuel cell stack of claim 1 wherein a portion of said gas diffusion layer contacts a portion of said peripheral area adjacent said channel.

13. The fuel cell stack of claim 1 further comprising a second channel in said peripheral area on a second side of said fluid flow plate and receiving a second portion of said gas diffusion layer, said channel and said second channel separated from each other.

* * * * *